US 9,294,778 B2

(12) United States Patent
Jalowiecki et al.

(10) Patent No.: US 9,294,778 B2
(45) Date of Patent: Mar. 22, 2016

(54) BLOCK MOTION ESTIMATION

(75) Inventors: Ian Paul Jalowiecki, High Wycombe (GB); Martin Whitaker, High Wycombe (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 688 days.

(21) Appl. No.: 13/695,542

(22) PCT Filed: May 4, 2011

(86) PCT No.: PCT/GB2011/000685
§ 371 (c)(1),
(2), (4) Date: Oct. 31, 2012

(87) PCT Pub. No.: WO2011/138584
PCT Pub. Date: Nov. 10, 2011

(65) Prior Publication Data
US 2013/0044825 A1    Feb. 21, 2013

(30) Foreign Application Priority Data
May 4, 2010   (GB) .................................. 1007406.0

(51) Int. Cl.
*H04N 19/56*    (2014.01)
*H04N 19/567*   (2014.01)
(Continued)

(52) U.S. Cl.
CPC ............. *H04N 19/43* (2014.11); *H04N 19/109* (2014.11); *H04N 19/115* (2014.11); *H04N 19/149* (2014.11); *H04N 19/176* (2014.11); *H04N 19/61* (2014.11)

(58) Field of Classification Search
CPC ........ H04N 19/51; H04N 19/59; H04N 19/43
USPC ........................................... 382/236; 375/240
See application file for complete search history.

(56) References Cited

U.S. PATENT DOCUMENTS 5,682,209 A * 10/1997 Borgwardt .................... 348/699
6,192,081 B1   2/2001 Chiang et al.
(Continued)

OTHER PUBLICATIONS

Tu, Yu-Kuang, et al. "Fast variable-size block motion estimation using merging procedure with an adaptive threshold." Multimedia and Expo, 2003. ICME'03. Proceedings. 2003 International Conference on. vol. 2. IEEE, 2003.*
Cheung, Chun-Ho, and Lai-Man Po. "Adjustable partial distortion search algorithm for fast block motion estimation." Circuits and Systems for Video Technology, IEEE Transactions on 13.1 (2003): 100-110.*

(Continued)

*Primary Examiner* — Sath V Perungavoor
*Assistant Examiner* — Clifford Hilaire

(57) ABSTRACT

Methods and apparatus for conducting motion searching are provided. A first 2D array includes interconnected multi-directional shift registers for storing and shifting image values corresponding to a search window within a search region. A second 2D array includes registers for storing image values corresponding to a macroblock. A distortion calculation module is arranged to calculate and output a distortion value corresponding to the difference between image values stored in associated registers of the first and second arrays. The distortion value quantifies the correlation between the search window and the macroblock. The shift registers of the first 2D array are controlled to pass image values between adjacent shift registers to translate the position of the search window within the search region. Distortion values outputted after progressive shifts of the first 2D array are tracked to determine an optimal registration position of the macroblock relative to the search region.

13 Claims, 8 Drawing Sheets

Illustration 2: MEPU iintegration

(51) Int. Cl.
   *H04N 19/43*    (2014.01)
   *H04N 19/176*   (2014.01)
   *H04N 19/149*   (2014.01)
   *H04N 19/115*   (2014.01)
   *H04N 19/61*    (2014.01)
   *H04N 19/109*   (2014.01)
   *H04N 19/563*   (2014.01)

(56) References Cited

U.S. PATENT DOCUMENTS

| | | | |
|---|---|---|---|
| 2002/0015446 A1 | 2/2002 | Miyaji et al. | |
| 2003/0012281 A1* | 1/2003 | Cho | H04N 5/145 375/240.16 |
| 2003/0016748 A1* | 1/2003 | Hwang et al. | 375/240.12 |
| 2007/0268964 A1* | 11/2007 | Zhao | 375/240.1 |
| 2008/0133881 A1* | 6/2008 | Georgi et al. | 712/28 |

OTHER PUBLICATIONS

Liu, Zhenyu, et al. "32-parallel sad tree hardwired engine for variable block size motion estimation in HDTV1080p real-time encoding application." Signal Processing Systems, 2007 IEEE Workshop on. IEEE, 2007.*

Babionitakis, Konstantinos, et al. "A real-time motion estimation FPGA architecture." Journal of Real-Time Image Processing 3.1-2 (2008): 3-20.*

Seung-Man Pyen et al: "An Efficient VLSI Architecture for Full-Search Variable Block Size Motion Estimation in H.264/AVC" In: "Advances in Multimedia Modeling [Lecture Notes in Computer Science]", Jan. 9, 2007, Springer, Berlin, Heidelberg, XP019054891, ISBN: 978-3-540-69428-1.

Zhenyu Liu et al: "32-Parallel SAD Tree Hardwired Engine for Variable Block Size Motion Estimation in HDTV1080P Real-Time Encoding Application", IEEE Workshop on Signal Processing Systems, Oct. 1, 2007, XP031164045, ISBN: 978-1-4244-1221-1.

* cited by examiner

*Illustration 1: MEPU module architecture*

*Illustration 2: MEPU iintegration*

*Illustration 3: calculation of seed cache address*

BLOCK MOTION ESTIMATION

This application claims the benefit of Great Britain Patent Application No. GB1007406.0, filed May 4, 2010, the disclosure of which is fully incorporated herein by reference.

FIELD OF THE INVENTION

The present invention relates generally to video compression techniques. In particular, the present invention relates to a method and apparatus for improved motion estimation/search.

BACKGROUND OF THE INVENTION

Digital video transmission, in particular streaming over communication channels such as over the Internet generally requires the video to be encoded prior to transmission. It is preferably to be able to compress digital video in a way that minimises bandwidth usage, whilst at the same time can deliver smooth video of an adequate quality.

A number of widely used standards exist, such as MPEG-1 and MPEG-2, which specify the form of digital video encoding. However, these standards do not constrain every aspect of converting image sequences of digital video between uncompressed and compressed formats. One of a number of proprietary functions may be implemented within the framework of these established standards. As such, there is an opportunity for the design of encoder methods and systems to be modified and improved.

One area of digital video encoding is intra-frame coding in which compression is applied to the information of a single frame of a video image sequence. This generally includes the application of techniques known in the art such as;

a) shifting the frame from the RGB into the YCbCr colour space and reducing the chrominance information by up to a quarter;
   b) applying a DCT to the frame and applying a quantisation matrix;
   c) run-length amplitude/variable length coding the frame; and
   d) using rate control to prevent buffer underflow/overflow.

Another area of digital video encoding is inter-frame coding in which similarities between a series of image sequences (i.e. the temporal redundancies) are exploited. In particular, an encoder can forward predict a future frame (P-frames) from a starting intra-frame (or I frames). In addition, bi-directional interpolated prediction frames (B-frames) can be used to forward and backward interpolate the frames of a video sequence. In each case, encoding the temporal prediction information generally involves the use of a technique known as motion estimation.

Motion estimation involves comparing frames in a sequence and representing the change between the frames such that only the portions that are different from one frame to another need be transmitted. This analysis involves determining how portions of an image may have moved over time, between frames—a so-called 'motion search' or 'motion estimation'. For example, for a video sequence showing an airplane moving across a uniformly blue sky, a motion search will be conducted to determine how the portion of the image containing the airplane changes from one frame to the next. If a video sequence involves a camera-pan of a stationary environment, for example of a garden, then there will be uniform change in displacement of almost every image portion in the same direction. If the video to be encoded displays players on a sports field heading in different directions at different speeds, each portion of one frame to the next will need to be tracked individually. In all cases, determining how individual image portions have moved allows as much image information as possible to be carried forward from one video frame to the next, reducing the amount of 'new' information that needs to be transmitted.

A macroblock represents a fundamental 'portion' of a video frame. Macroblocks are usually 16×16 pixels in size, although other block sizes (e.g. 8×16, 16×8, 8×8, 4×8, 8×4, and 4×4) are possible by regularly sub-dividing the fundamental 16×16 macroblock. Motion search is conducted within the YCbCr colour space on each luminance macroblock, one macroblock at a time, starting at the top left-hand macroblock, proceeding row-wise left to right, then top to bottom. For each macroblock, a two-dimensional spatial search is carried out to determine how each macroblock has changed its position over a series of frames. The change in the position of a macroblock from one frame to the next is encoded as a motion vector. Thus motion vectors can be used in mapping the spatial displacement of macroblocks from one video frame to the next.

How this spatial search is conducted is one of the aspects not constrained by the MPEG-1 or 2 standards, and this is the subject matter to which the present invention particularly relates.

When conducting a search, it is necessary to determine whether a good enough match has been made between one macroblock and the next. The quality of a match may be determined by calculating the difference between two macroblocks. One well-known measure of the difference is termed the 'sum of absolute differences' (SAD) the result of which is generally referred to as 'distortion'. A challenge is to find the minimum distortion that will yield the appropriate motion vector for a given macroblock.

The spatial search is usually confined to a small area surrounding the macroblock for which is search is being carried out. This is because it is computationally too expensive for an encoder to search the entirety of a frame for a match—especially if encoding needs to be performed in real-time. In addition, since larger motion vectors can take up significantly more bandwidth than smaller motion vectors, it can be better to transmit a smaller motion vector to a relatively distorted match than a larger motion vector to a better match.

For this reason, the conventional range of possible movement of a macroblock from one frame to the next is confined. For example, a standard 16×16 macroblock is generally confined to +/−16 pixels in the vertical and horizontal directions—corresponding to a search area of 48×48 pixels or a 33×33 search extent. In a so-called 'exhaustive motion search', every location within the 33×33 search extent is searched and the result yielding the minimum distortion is selected.

Whilst the exhaustive motion search is comprehensive, it is not necessarily considered to be appropriate for applications for which the efficiency of encoding is a priority. As a result, less comprehensive motion searches that yield relatively good results tend to be more desirable. An example of such a non-comprehensive search is a 'diamond motion search'.

The conventional diamond motion search is based on the premise that image portions within a video sequence will usually travel very short, or no distance from one frame to the next. As a result, the nearby locations surrounding a macroblock are searched first to see which yields a minimal distortion. From this it can be inferred which area is the most promising for further searching. Further searching is conducted in a similar manner, and so the diamond motion search gradually 'zeroes in' on a low distortion area.

In particular, the locations above, below, to the left and to the right of a macroblock (in a 'diamond shape') are the first analysed. If the best location is the position below the original macroblock, then the next iteration of the search is conducted around that location and continues until a better match cannot be found—i.e. until it appears that the best motion vector for a macroblock has been located.

Whilst the diamond motion search is efficient, it suffers from the drawback of being susceptible to local maxima. This is because initially unpromising search locations are further ignored (and so it can be said that the search is terminated prematurely before the best match in actuality has been found). Furthermore, the diamond motion search requires a check to be made following each iteration to determine the best candidate direction for further searching, which can be computationally demanding. In addition, it is a poor technique for video sequences containing rapidly moving objects for which macroblock translation may be large in comparison the effective search area.

Another technique used to minimise the amount of information transmitted between frames is motion prediction. The information that this technique aims to minimise is that relating to motion vectors. It works on the assumption that a number of contiguous macroblocks within a frame are likely to have similar motion vectors. For example, in the above example in which there is a camera-pan across a stationary environment, the motion vectors of virtually all the macroblocks will be highly correlated. As a result, motion prediction takes into account the macroblocks for which motion vectors have already been calculated. Thus a 'predicted motion vector' can be used for subsequent macroblocks. To minimise bandwidth usage, the difference between the actual motion vector for that subsequent macroblock, and the predicted motion vector is transmitted. In particular, a 'global motion vector' may be set from which individual motion vectors deviate.

Motion prediction may be used to seed macroblocks to be searched, and in the example of the diamond motion search, a preferred starting location for the diamond motion search may be decided as a result of the outcome of motion prediction for previous macroblocks. Whilst this approach generally yields an efficient outcome, this is not always the case. For example, motion prediction is not necessarily desirable in cases where the movement of adjacent macroblocks are not highly correlated—for example, where there are many image objects moving at in different directions.

The development of technology in this area is focussed on providing more efficient algorithms that can determine a very good match for a macroblock whilst not necessarily needing to conduct an extensive search. This is so that a video stream encoder can perform encoding quickly and efficiently. However, this approach can cause detriment to the quality of a video stream in a number of cases in which there is quick and/or non-correlated movement of objects within a video sequence. This is not satisfactory within an operational environment in which broadcast quality is of great importance.

In particular, when there is a motion search conducted, the number of steps taken to find the best match can vary significantly depending on the nature of the frames being encoded. This leads to non-determinism within such 'efficient' algorithms that is not necessarily suitable for encoding tasks demanding a guaranteed video quality, especially for applications such real-time high-definition television broadcasting.

On the one-hand, conducting an exhaustive motion search can guarantee the best possible quality encoding (therefore making the best use of the channel bandwidth). However, the more comprehensive the motion search, the more computationally expensive it is, and so the longer encoding can take. This is a significant consideration when there are hard time limits imposed on encoding tasks, for example during real-time encoding.

One solution to this problem is to provide hardware that is capable of conducting the computationally expensive calculations within the time constraints—for example, motion searching may be parallelised. However, such hardware comes at a cost of greater complexity and 'silicon real-estate' on a circuit board—and so a greater cost in financial terms as well.

Therefore, there is a need for a method and system for motion search that provides an optimal trade-off between hardware costs, timing constraints, quality of video, and bandwidth limitations.

SUMMARY OF THE INVENTION

According to a first aspect of the present invention there is provided a digital processing apparatus suitable for use in video encoding, the apparatus being arranged to conduct motion searching by comparing an image macroblock against a plurality of positions within an image search region, the apparatus comprising:

a first 2D array comprising interconnected multi-directional shift registers for storing and shifting image values corresponding to a search window within the search region;

a second 2D array comprising registers for storing image values corresponding to a macroblock; and a distortion calculation module operatively connected to the first and second 2D arrays, the distortion calculation module being arranged to calculate and output a distortion value corresponding to the difference between image values stored in associated registers of the first and second arrays, the distortion value thereby quantifying the correlation between the search window and the macroblock;

wherein the apparatus is arranged, in use:

to control the shift registers of the first 2D array to pass image values between adjacent shift registers to translate the position of the search window within the search region; and to track distortion values outputted after progressive shifts of the first 2D array thereby determining an optimal registration position of the macroblock relative to the search region.

Advantageously, by using interconnected multi-directional shift registers, it is possible to increase the speed with which a motion search comparison can be made between the macroblock and a search location. This is because a simple shift operation is computationally inexpensive. Although it may be more complicated to implement such multi-direction shift registers in hardware, they take up a relatively small area of silicon real-estate and provide substantial speed benefits over prior known hardware-implemented motion searching apparatus.

Ideally, the interconnections between the multi-directional shift registers cross-link the shift registers to one another so as to enable image values to be passed between adjacent shift registers both horizontally and vertically. Ideally, the interconnections are bi-directional to enable image values to be passed in both directions along horizontal or vertical directions. Advantageously, the cross-linking and bi-directionality of the interconnections grants flexibility to the chosen motion search pattern of the macroblock relative to the search region.

Preferably, the shift registers are arranged to pass values in a common direction per shift. Advantageously, this simplifies the operation of the shift registers, thereby allowing their control to be simplified. For example, a single shift command can control all of the shift registers to pass values between adjacent shift registers from left to right—thereby offsetting the position of the search window one position to the left within the search region.

Preferably, the apparatus comprises a cache for storing image values corresponding to the search region. Ideally, the apparatus is arranged, in use, to transfer appropriate image values from the cache to shift registers disposed along the periphery of the first 2D array so as to reconstruct the search window following a shift operation.

Advantageously, the combination of the cache and the first 2D shift array provides an optimal trade off between speed and architectural complexity and flexibility. It will be understood that during a shift operation, shift registers on a peripheral leading edge of the first 2D array will shift their values to adjacent shift registers located inward of the cache. Accordingly, the cache can be used to repopulate those shift registers with appropriate image values. For example, if the values in the shift registers are being shifted one place from left to right, the shift registers disposed on the leftmost leading peripheral edge of the first 2D array will transfer their pre-shift values to respective adjacent shift registers to the right. Accordingly, the post-shift values of those leftmost shift registers are obtained from the cache.

Preferably, the apparatus is arranged, in use, to initially load image values into the first 2D array corresponding to a search window centrally located within the search region. Advantageously, centre-weighting the search increases the likelihood of finding an optimal match early. Preferably, the apparatus is arranged, in use, to control the shift registers of the first 2D array to progressively translate the position of the search window within the search region in a spiral search pattern. Advantageously, a spiral search pattern is centre-weighted and requires only a single shift per unique search location. Accordingly, the spiral search pattern represents a highly efficient way of searching a macroblock against a search region.

Preferably, the apparatus comprises a motion vector generator for generating a motion vector corresponding to the relative positional difference between the macroblock and the search window. It will be appreciated that the calculation of motion vectors are well known to a person skilled in the art.

Preferably, the apparatus comprises a bandwidth cost estimation module for estimating a bandwidth cost associated with a distortion value and a corresponding motion vector. Ideally, the bandwidth cost estimation module is arranged to track an optimal bandwidth cost associated with encoding a macroblock.

Preferably, the apparatus comprises a time budget management module for controlling at least the number of shifts carried out by the first 2D array so as to manage the time spent performing each motion search operation. To this end, the time management module may be arranged to track the time taken to carry out one or more motion searches. Advantageously, the time management module can therefore ensure that a video encoding operation is time-deterministic.

The time budget management module may be operatively connected to the distortion calculation module for monitoring the distortion value associated with each shift. Ideally, the time budget management module is arranged to early terminate a shift operation if the distortion value is below a threshold value. Similarly, the time budget management module may be operatively connected to the bandwidth cost estimation module to monitor an optimal bandwidth cost, the time budget management module being arranged to early terminate a shift operation if the bandwidth cost is below an associated threshold value.

Preferably, the time budget management module is arranged to dynamically control one or more threshold values.

Ideally, the time budget management module is arranged to receive a time budget within which to perform a plurality of motion search operations and dynamically apportion the time spent on each motion search operation in dependence on the progress of each motion search and/or the priority assigned to each motion search operation.

Advantageously, it is possible to exploit the possibility of early termination to get more work out of the hardware than if an exhaustive search is conducted for each search region of the plurality. For example, if the time budget provides for N cycles, and an exhaustive search takes M cycles, then it is possible to do N/M searches. However, it is also possible to make use of early termination to conduct a greater number of searches using the same hardware. For example, if the average time of an early-terminated search is P cycles (where P<M) then conducting N/P searches with the same hardware.

The apparatus may comprise a seed list generator for generating a prioritised list of seed search regions against which a macroblock is to be searched. To this end, the seed list generator may be arranged to analyse a video image frame to estimate seed search regions within which to conduct more detailed motion searches in respect of a given macroblock.

Accordingly, and more advantageously by ordering and weighting the list the higher priority (typically earlier) searches can be assigned more of the total seed list time-budget. The time budgeting will lead to a deterministic maximum time, but the outcome may be sub-optimal for one or more of the searches (i.e. they run out of time before finding the 'best' match). In the worst case the outcome could be severely sub-optimal—but this is unlikely.

Preferably, the seed list generator is arranged to down-sample a video image frame and a macroblock, feed the down-sampled video image frame and macroblock into the first and second 2D arrays to conduct a motion search operation and thereby determine a prioritised list of seed search regions within the original image frame against which the original macroblock may be searched.

Preferably, the time budget management module may be operatively connected to the seed list generator to receive a prioritised list of candidate search regions.

Preferably, the apparatus is arranged to compare an image macroblock as well as its sub-partitions against a position within the image search region as part of a common comparison operation. Advantageously, the common comparison operation enables multiple encoding approaches to be determined substantially simultaneously.

Preferably, the distortion calculation module is arranged to calculate and output, as part of a common operation, a plurality of distortion values, each distortion value corresponding to either a macroblock or one of the sub-partitions of the macroblock. Advantageously, it is therefore possible to quantify the correlation between a macroblock and a position within the search region and as part of the same operation also quantify the correlation between macroblock sub-partitions and their associated positions within the search region.

Preferably, the distortion calculation module comprises a distortion value summing tree for progressively summing the differences between image values in the first and second 2D arrays. Preferably, the root of the summing tree is arranged to output the total sum of the differences between the first and second 2D arrays, thereby outputting the correlation between the macroblock and a position within the search region. Preferably, the summing tree comprises intermediate sampling points at each of which is output the correlation between macroblock sub-partitions and their associated positions within the search region. Advantageously, the summing tree represents a very efficient way to calculate both total and partial sums of the differences between the first and second 2D arrays.

Preferably, the bandwidth cost estimation module comprises a cost-tracking table arranged to track optimal distortion values associated with the macroblock and each sub-partition. Preferably, the cost-tracking table is further arranged to track motion vectors associated with the optimal distortion values. Advantageously, it is possible to concurrently generate a set of bandwidth costs. Therefore, advantageously, the apparatus can be further arranged, in use, to select the most appropriate encoding solution in response to the set of bandwidth costs within the cost-tracking table.

It should be appreciated that an encoding solution may comprise encoding a macroblock-sized distortion map together with a single motion vector (e.g. cost 16×16=bc of 16×16+1mv) or one of aggregated sub-divisions thereof (e.g:

cost 16×8=(bc of 16×8a+1mv)+(bc of 16×8b+1mv); or cost 8×16=(bc of 8×16a+1mv)+(bc of 8×16b+1mv); or cost 8×8=(bc of 8×8a+1mv)+(bc of 8×8b+1mv)+(bc of 8×8c+1mv)+(bc of 8×8d+1mv); or cost 4×4=16mv+bc of 4×4(a . . . p);

etc.)

According to a second aspect of the present invention there is provided a method of conducting motion searching for use in video encoding in which an image macroblock is compared against a plurality of positions within an image search region, the method comprising the steps of:

loading image values corresponding to a search window within the search region into interconnected multi-directional shift registers of a first 2D array;

loading image values corresponding to a macroblock into the registers of a second 2D array;

calculating and outputting a distortion value corresponding to the difference between image values stored in associated registers of the first and second arrays, the distortion value thereby quantifying the correlation between the search window and the macroblock;

controlling the shift registers of the first 2D array to pass image values between adjacent shift registers to translate the position of the search window within the search region; and tracking distortion values outputted after progressive shifts of the first 2D array to determine an optimal registration position of the macroblock relative to the search region.

It will be understood that features of the first and second embodiments of the present invention may be combined or interchanged where context allows. Accordingly aspects of the present invention provide a method and an apparatus for conducting motion search for use in video encoding. Advantageously, the motion search can be time-deterministic. The motion search may be fully costed, adaptive and/or multi-portion.

DETAILED DESCRIPTION OF THE INVENTION

Embodiments of the present invention will now be described by way of example.

A general overview of embodiments of the present invention will first be described before explaining the detailed implementation in hardware at a module level.

Overview

Figure 1:
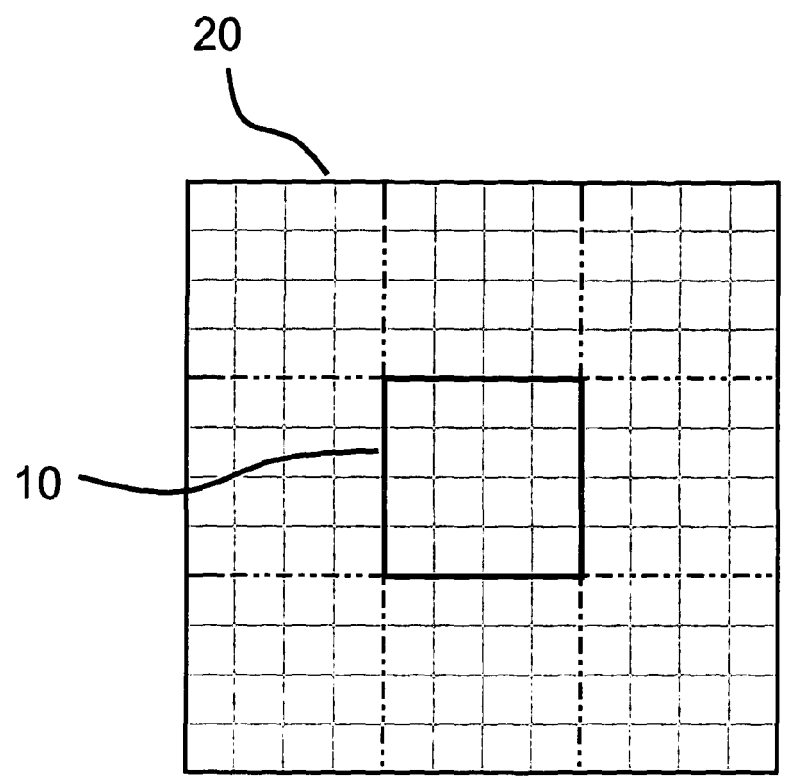
FIG. 1 depicts a pixel block to be compared against an image search region in accordance with an embodiment of the present invention.

As mentioned, it is necessary to find the best match for a macroblock within a reference area (an image search region). Generally, a standard target macroblock size is 16×16 pixels (or pels) and the image search region is generally 48×48 pixels. However, for ease of understanding, FIG. 1 shows an illustrative example of 4×4 pixel block 10, which is being compared against a 12×12 image search region 20. It will be understood however, that the same principles apply to macroblocks 10 of 16×16 size and corresponding larger image search regions.

In this illustrative example, for an exhaustive motion search, the block 10 will need to be compared with the underlying image of the search region in 9×9 (i.e. 81) different locations.

Pixels of macroblocks and image search region may be of one of hundreds of different luminance levels. However, for simplicity, only four different luminance levels are represented in the present illustrative example. I.e. the block 10 and the search region 20 contain only four different luminance levels, as indicated in FIG. 2 by the four styles of hatching.

During an iteration of a search, the luminance of each block 10 is compared with the luminance of an aligned area within the search region 20. This comparison is conducted using a method known in the art as 'the sum of absolute differences (SAD)'. This method averages the difference in luminance levels of the sixteen pixels being compared, thereby outputting a single distortion value. It will be understood that other distortion methods and metrics are possible—for example, the sum of absolute transform differences (SAID) that conducts matches in the frequency domain. In particular, as is known in the art, SATD works by taking a frequency transform, usually a Hadamard transform, of the image values being compared.

Figure 2:
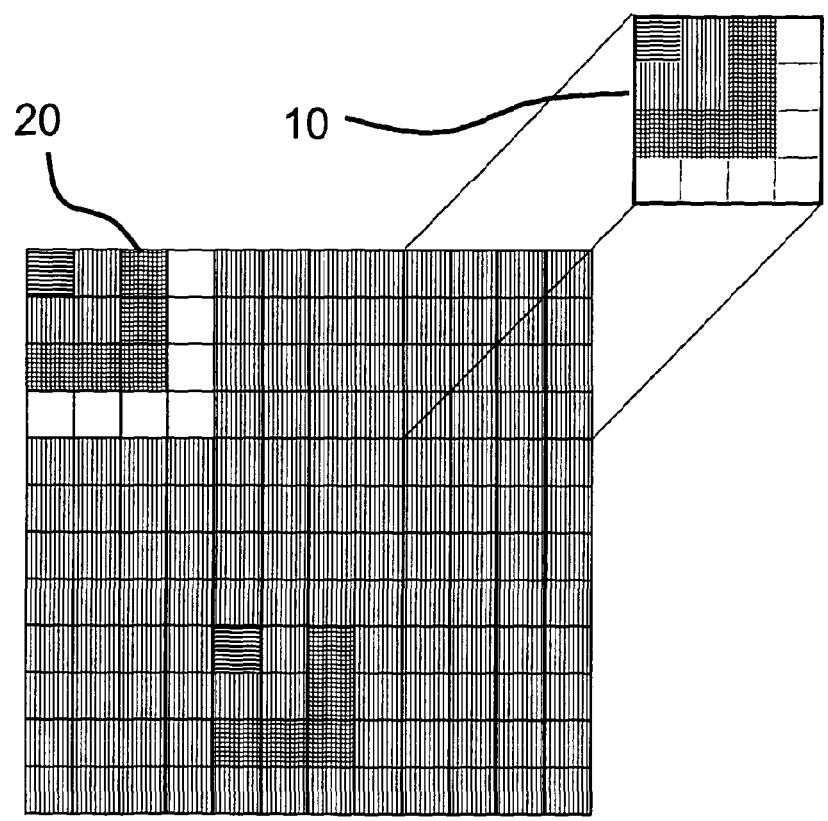
FIG. 2 depicts a pixel block compared against a first location within a search region in accordance with an embodiment of the present invention.
Figure 3:
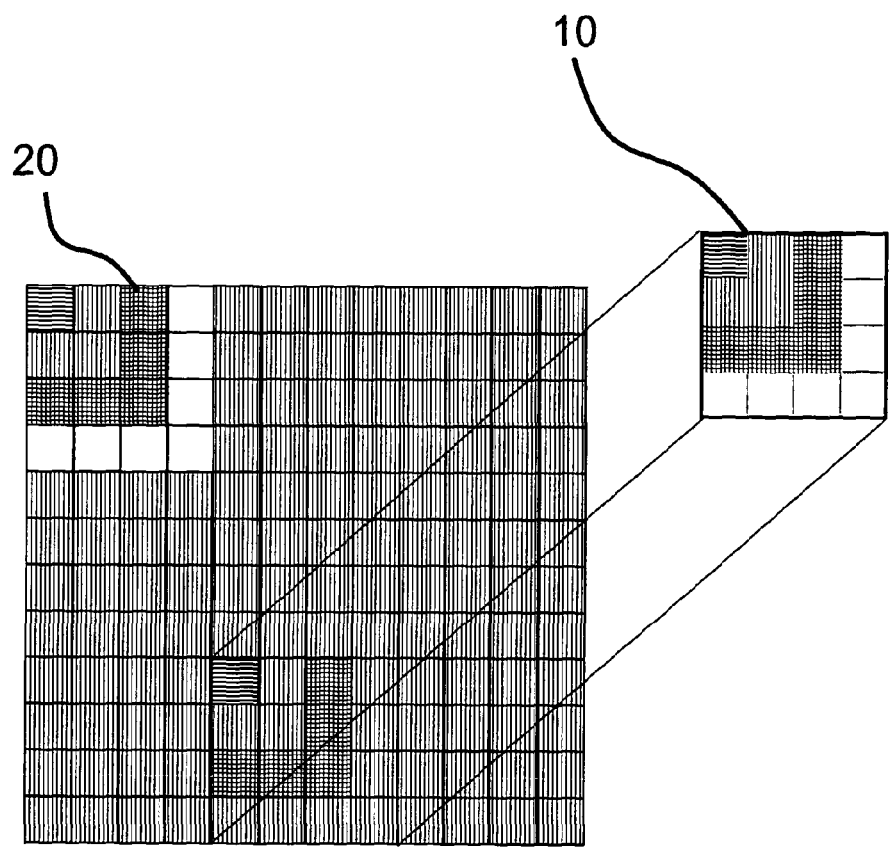
FIG. 3 depicts a pixel block compared against a second location within a search region in accordance with an embodiment of the present invention.
Figure 4:
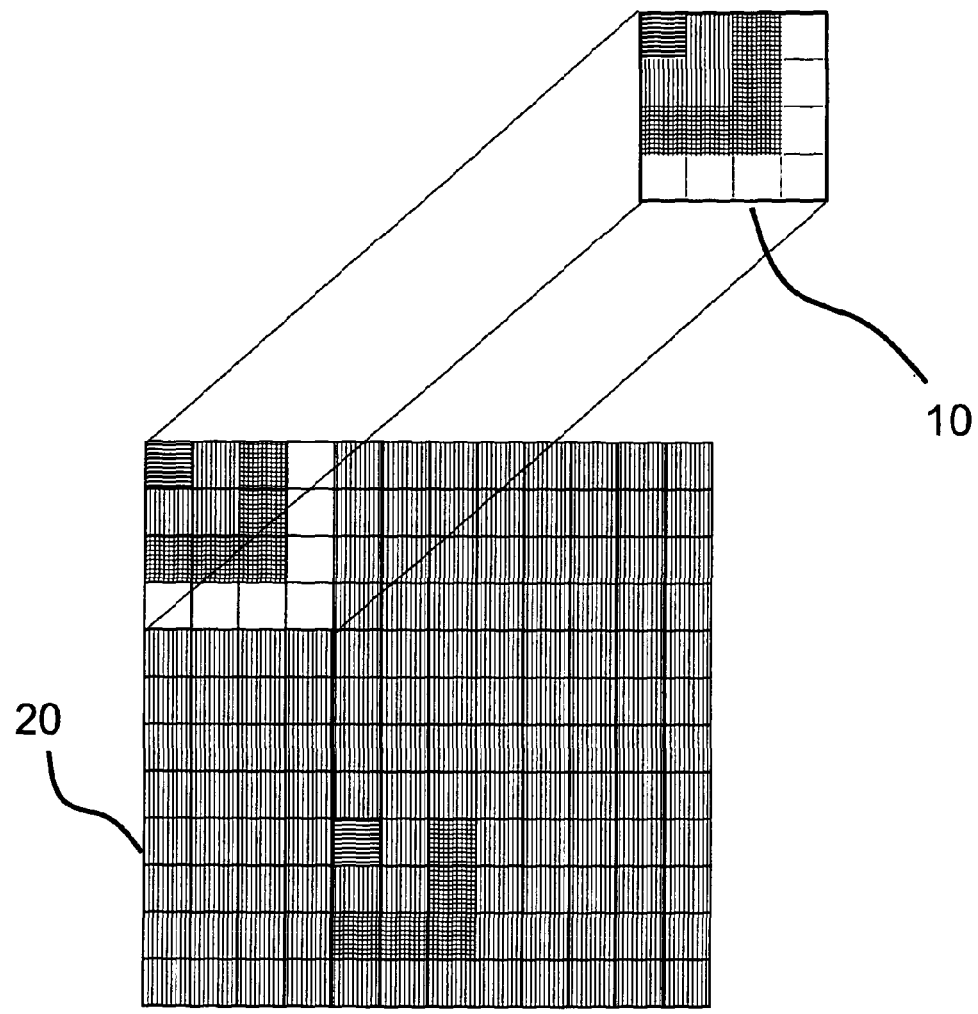
FIG. 4 depicts a pixel block compared against a third location within a search region in accordance with an embodiment of the present invention.

FIGS. 2 to 4 show the block 10 being compared against various locations within the same search region 20. In particular, FIG. 2 shows a comparison against a first top-right location, FIG. 3 shows a comparison against a second bottom-middle location and FIG. 4 shows a comparison against a third top-left location within the search region 20. As can be seen, the match shown in FIG. 2 will have the highest distortion value returned by the SAD metric (worst match), FIG. 3 will be of an average distortion, and FIG. 4 has no distortion (perfect match). In particular, the values in the 4×4 block 10 and the corresponding values in the top-left location within the search region 20 are identical.

During a conventional diamond motion search, the 4×4 block will be first compared against the central location, and locations above, below, to the left and to the right of the centre. Each of the SAD results for each of these initial locations will be compared before subsequent match trials. In the example of a luminance arrangement shown in FIGS. 2, 3 and 4, the most promising SAD result found by the initial matching exercise would be at the second middle-bottom location, as shown in FIG. 3. As the diamond motion search is not exhaustive, areas of search that don't appear to initially yield good SAD results are not further investigated. Thus the top, left and right locations are ignored and the algorithm focuses on the area at the bottom.

A second diamond search surrounding this bottom location would then be conducted and so forth. Therefore, the diamond motion search will be drawn into the local maxima presented by the middle-bottom location instead of resolving the better match at the top-left location as shown in FIG. 4.

In contrast, the present invention is able to conduct comprehensive and deterministic searches that can always find the best match.

Figure 5:
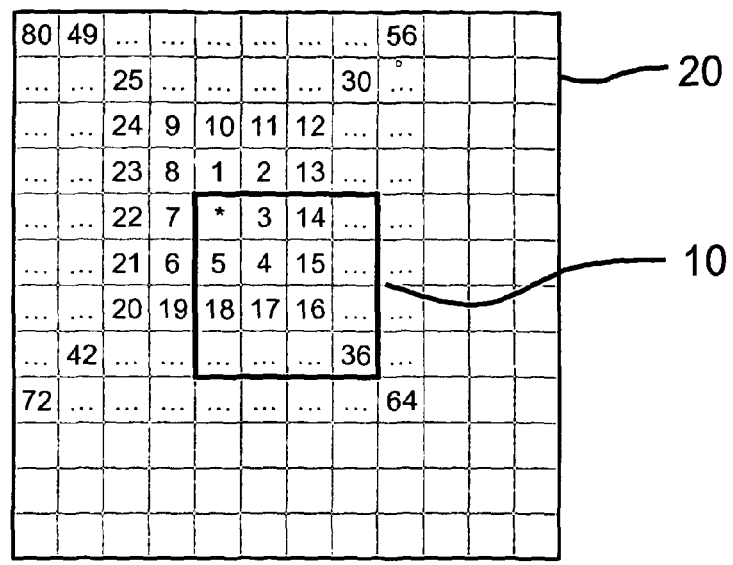
FIG. 5 depicts a spiral search in accordance with an embodiment of the present invention.

The search pattern adopted by the present embodiment is spiral, starting from the centre of the search region 20, and spiraling outwards clockwise. Referring to FIG. 5, if the top left hand pixel [*] of the centred 4×4 block 10 is treated as the reference pixel for that block 10, the spiral pattern will proceed in the numerical order shown. Thus it can be seen that all 81 different locations will be searched in a fixed length search.

This search pattern is particularly advantageous because it allows the exhaustive motion search to be implemented in way that can reduce the total number of hardware operations taking place to complete the exhaustive motion search very quickly. In particular, whilst algorithms such as the diamond motion search are set up to run a non-exhaustive search efficiently on general purpose processing architectures, the present embodiment takes a different approach in that an exhaustive search is carried out on dedicated hardware architecture. Advantageously, this task is handled in a computationally efficient manner, and the hardware used to carry out the task does not require as much 'silicon real estate' as a general-purpose architecture to do so. In other words, assuming that an exhaustive motion search is necessary, the present hardware arrangement allows that exhaustive motion search to be conducted more quickly than other prior known hardware arrangements.

The hardware realisation of the spiral search is via a series of registers. More precisely, a 2D array of interconnected multi-directional shift registers is used to perform successive comparisons of the target block 10 against different areas within the image search region 20.

Figure 6:
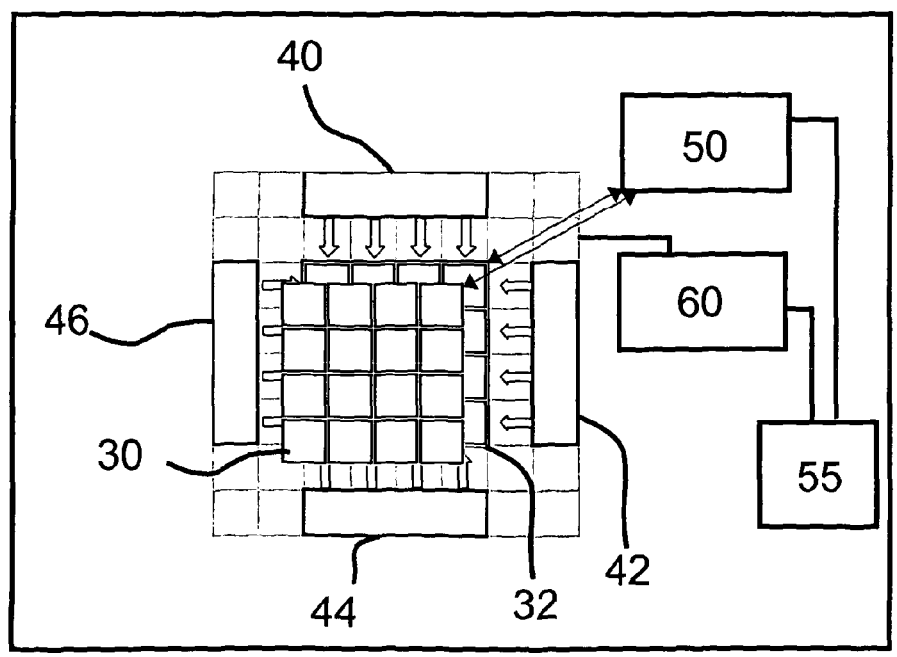
FIG. 6 depicts an apparatus for conducting motion searching in accordance with an embodiment of the present invention.

The principle of how this 2D shift array arrangement operates is shown schematically in FIG. 6 in which a schematic view of an apparatus 1 for conducting motion searching is shown. In this illustrative example, the shift array 32 is a 4×4 array of shift registers, the shift array 32 being represented schematically in FIG. 6 behind a standard 2D array 30 of standard registers also arranged in a 4×4 block. The 4×4 block to be compared is loaded into the standard array 30. The centre part of the image search region 20 against which the block 10 is to be compared is loaded into the shift array 32.

For each comparison made, the difference between the pixel values held by the standard array 30 and the corresponding pixel values of the shift array 32 is calculated using a sum of absolute difference (SAD) approach. In particular, a distortion calculation module 50 operatively connected to shift array 32 and the standard array 30 is arranged to calculate a distortion value corresponding to the difference between image values stored in the standard array 30 and the shift array 32. After the entire reference seed region has been searched, the best sum of absolute difference result in the form of the lowest distortion value is used to indicate the best match within the search region for the block 10 being searched.

From this, the motion vector for the match position can be determined. In particular, a motion vector generator 60 tracks the position of the block 10 within the search region and whenever a distortion minima is encountered, generates a motion vector associated with that minima. The motion vector and the corresponding distortion value can be stored alongside one another in a cost-tracking table 55.

Viewed face-on, the shift array 32 is able to shift in either the horizontal or vertical direction. Therefore, to execute the first step of the spiral search, the shift array 32 shifts the values loaded into the registers down one place. The values in the bottom row are discarded, and a first cache 40 populates the values in the top row. To execute the second step, the shift array 32 shifts the values in its registers one place from right to left, the values in the left-most columns being discarded, the right-most columns being populated by a second cache 42. The bottom and left-most rows are populated in a similar way by a third cache 44 and fourth cache 46. It will be understood that these different cache entities 40, 42, 44, 46 are shown to be separate for ease of understanding. In an implementation of the present invention, a single cache in fact fulfils their separate functions.

Advantageously, the shift array 32 obviates the need to load in a completely new set of pixel luminance values from a cache every time a comparison is to be made. Rather, the majority of the values are retained within the shift register, but merely shifted in position to make way for a row or column of new values.

In one implementation of the present invention, the shift array 32 may be sufficiently large to preclude a cache hit for every single shift. In particular, the search window is smaller than the shift array 32 and so image values stored in the shift array 32 may cover the search region at least in part. Moreover, in a particularly advantageous implementation of the present invention the shift array 32 may be sized to accommodate either the entire width or height of the search region. Advantageously, by restricting the hits on the cache to row-only data maximises the efficiency of the transfer between the cache and the shift array 32.

However, referring back to the illustrative example in FIG. 6—in which the cache transfers image rows and columns—the benefit of this arrangement is nonetheless clear. Rather than needing to load 16 new values (4×4) for each comparison to be made, only a row or column—i.e. 4 new values need be loaded from the cache. The 12 other values are already in the array—having been retained after the shift.

This is useful as it can be computationally less expensive to shift 16 values+load 4 new values from cache, than load 16 new values from cache each time. Thus, by using the combination of a 2D shift array 32 and a supporting cache, an exhaustive motion search can be carried out very efficiently in terms of computational cost in hardware.

This approach has further advantages over a conventional diamond motion search in that it does not suffer from delays associated with checking, after each iteration, which result indicates the best place to continue a search for a best match. That is, unlike a conventional diamond motion search, the continued search is not contingent on a computationally expensive comparison. Accordingly, it is possible to very quickly compare all of the possible locations within a search region to determine a best match without needing to conduct an intermediate check before moving onto the next iteration of the search. As a result, the process of the present embodiment can be pipelined, and is always guaranteed to find the best match within a given search extent by the end of a predetermined number of clock cycles. As such, the search is high quality and deterministic.

As mentioned, the simplified examples shown in FIGS. 1 to 6 show a 4×4 block being searched against a 12×12 reference seed region. However, the present embodiment finds particular application in the situation where a standard macroblock of size 16×16 is searched against an area of 48×48. It will be appreciated, under these conditions the advantages of this spiral searching technique is far more pronounced.

The versatility of the spiral search can be exploited further in the determination of the best macroblock-motion vector combinations.

As mentioned previously, when tracking macroblocks from one frame to the next within the same scene, there is a good chance that the motion vectors of large sets of macroblocks will be highly correlated. As a result, it may be appropriate to define a global motion vector to be applied to all the macroblocks within a frame. This provides a good starting point from which to determine the likely motion vector of each macroblock and thus also to define where the reference seed region to search within will be. However, if there is a dramatic event in a video sequence (for example, a scene change or movement by a number of different objects in different direction) then a global motion vector may not necessarily be appropriate, and it becomes necessary to be able to track individual macroblocks, and specify where the reference seed regions will be in another way. In particular, it can be advantageous to analyse the entire video frame to determine the best candidate macroblock-motion vector combinations. This can be accomplished using the same spiral search method and hardware architecture to conduct a coarse motion search. In particular, a seed list generator can be used to utilise the results of the coarse motion search to generate a prioritised list of seed search regions.

In a large area search (coarse motion search) a high-resolution video frame image is down-sampled. Similarly, each macroblock is also down-sampled for use in searching the entirety of the high-resolution video frame. By way of example, a High-Definition (HD) video frame of resolution 1920×1080 may be down-sampled by a factor of eight to a 'thumbnail' 240×135 image, and a 16×16 macroblock is shrunk to a 2×2 mini-macroblock. The 2×2 mini-macroblock is then searched against the thumbnail image using the same spiral search as above.

The spiral search can therefore be used in the same way to compare the downscaled macroblocks against the reference search region, which in this case is the downscaled frame.

The purpose of this coarse level searching is more for determining a number of potential candidates for further investigation—i.e. by indicating roughly where within the frame a macroblock may have moved to. The further investigation is achieved by conducting subsequent more fine-grained searching operations in which a normal-sized macroblock of size 16×16 is searched within the standard search area—the reference seed region of size 48×48. Thus, the large area motion search provides an indication of where potential original motion vectors may be obtained for each macroblock.

It will be understood that in the event of a complete scene change that there may not necessarily be any good mini-macroblock matches available. There may be instead a large and (as the search continues for each mini-macroblock) an increasing number of mediocre candidates. In this case, it is useful not to spend too long in trying to find a best match for each potential candidate in the more fine-grained operation following on from each coarse-grained match.

As such, the method and system of the present embodiment comprises a time budget management module for controlling the time spent on one or more motion searches. The time budget management module may set an absolute time threshold, or a time budget threshold to limit the amount of time to be spent on attempting to resolve the best match out of a list of potential candidates.

The absolute time threshold is used to specify the extent of each spiral search. For example, referring to FIG. 5, instead of permitting the spiral search to reach the extremities of the reference seed region (examining 81 search locations), the absolute time threshold can limit the number of iterations. For example, the limit may be set to 40 search locations—effectively halving the search extent and so time per macroblock search.

The time budget threshold operates in a similar way, in that the extent of each spiral search is limited. However, the time devoted to each conducted search is weighted in order of priority. For example, where there are a number of candidates to investigate further following on from a coarse level search, a greater proportion of the time budget is devoted to investigate the better candidates from the results of the coarse level search. To this end, the time budget management module is arranged to be able to receive from an output of the coarse level search: a list of potential candidates to investigate further, their priority ranking and a total time budget in which to investigate the entire list. The management module will apportion the total time appropriately.

Another advantage of the apparatus of the present invention derives from another phenomenon—referred to here as multi-partitioning—which is supported by encoding standards.

As mentioned previously, macroblocks are usually 16×16 pixels in size. However, encoding standards support the fragmentation of this standard macroblock into subdivisions (such as two 8×16 blocks, two 16×8 blocks, four 8×8 blocks, eight 4×8 blocks, eight 8×4 blocks or sixteen 4×4 blocks). During a standard motion search, each of these fragments can be compared against the reference seed region independently of one another to find matches for each sub-partitions. Multi-partitioning in this way can therefore allow a better match between image portions of a series of frames to be determined. In particular, macroblock fragments may be better matched (and potentially in a less bandwidth-intensive way) than through comparing a 16×16 non-fragmented macroblock. Thus, the overall bandwidth cost of fragmentation may be less than non-fragmentation To expand on this point, the reusability of macroblock information from one frame to the next requires two main components associated with the original 16×16 macroblock to be determined—the motion vector translating the original macroblock to the new location in a subsequent frame, and the difference ('delta' Δ) between that translated macroblock and the new image. In short, the bandwidth cost is that to transmit/represent the motion vector mv and the difference Δ (in terms of bit count bc).

By way of example, bandwidth cost are represented below for a single 16×16 macroblock (a) four 8×8 macroblocks (b) and sixteen 4×4 macroblocks (c):

$$cost=1mv+bc(1\times(16\times16\times\Delta)) \quad (a)$$

$$cost=4mv+bc(4\times(8\times8\times\Delta)) \quad (b)$$

$$cost=16mv+bc(16\times(4\times4\times\Delta)) \quad (c)$$

In the event that the single delta Δ in (a) is much higher than the individual deltas Δ in (b) or (c), then this can more than offset the three or fifteen additional motion vector costs in (b) and (c) respectively, making (b) or (c) the less bandwidth intensive option.

In any case, as well as running comparisons for the 16×16 macroblocks, it is also very useful to find out whether there are good matches within the reference seed region for the fragments of the standard 16×16 macroblock as these may provide a better way of encoding the video sequence.

The advantage of the spiral search method and system in this context is that for every iteration or shift, it is possible to simultaneously compare against the reference seed region every permutation of a fragmented macroblock, as well as the main macroblock itself. That is, for every iteration, as well as running a comparison against the reference seed region with a single target 16×16 macroblock, the present embodiment also and simultaneously compares the reference region against two 16×8 blocks, two 8×16 blocks, four 8×8 blocks, eight 8×4 blocks, eight 4×8 blocks and sixteen 4×4 blocks. In other words, 41 searches are conducted simultaneously for each iteration.

To assess the best fragmentation pattern to use, the present embodiment comprises a fragment cost comparator for determining which macroblock arrangement has the lower bandwidth cost after the spiral search has completed.

Overall, it can be seen that the present embodiment of the invention provides an improved motion estimation apparatus and method that is exhaustive, multi-partition (i.e. operating on different macroblock fragment combinations), fully-costed (i.e. the bandwidth cost of a number of different encoding approaches are measured and compared against one another), time-deterministic (i.e. the speed at which a motion search is conducted can be predetermined) and adaptive (time thresholds can be altered to be able to meet varying timing demands).

Module Level Description

A detailed description of the motion search apparatus at a module level will now be described which allows the implementation of the above principles of operation.

In particular, the module level description explains the architecture, interfaces, memory/register maps, and behaviour of an integer Motion Estimation Processing Unit (MEPU) module.

1. Overview

Figure 7:
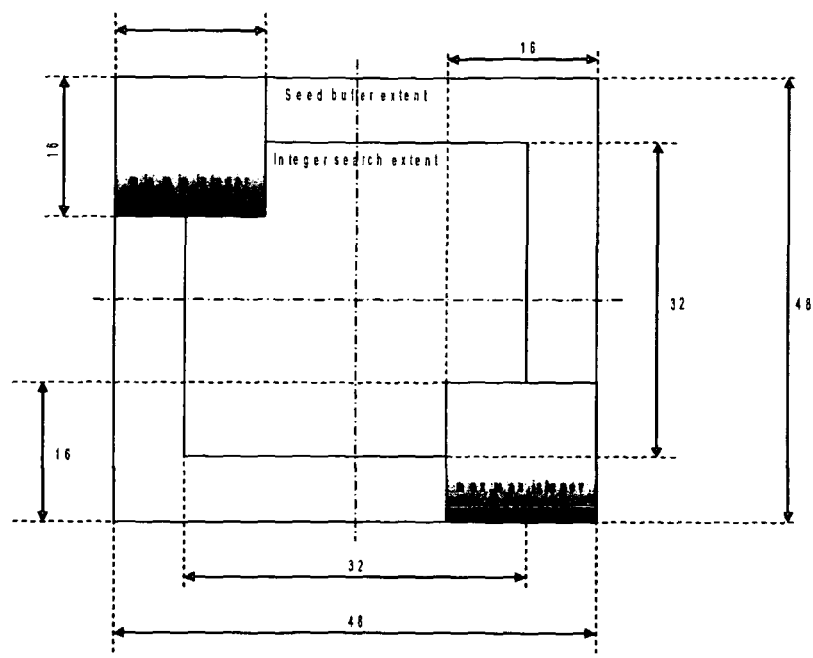
FIG. 7 depicts the general behavior of a Motion Estimation Processing Unit (MEPU) module in accordance with an embodiment of the present invention.

FIG. 7 represents the general behaviour of the MEPU module. The module will be fed with a target macroblock comprising a 16×16 pel luminance array and a reference seed region comprising a 48×48 pel luminance representation. Up to 32 requests may be enqueued for processing in strict queue order.

Having been fed with a target macroblock and a reference seed region, the engine will then perform an exhaustive integer-pel search across the 33×33 integer search extent, using a sum of absolute differences (SAD) cost metric to determine the optimum best-match location. The engine runs in two modes:

8×8 mode—The outcome will be nine motion vectors, corresponding to the best match for each of the nine possible block partitions (i.e. 16×16, 2×(16×8), 2×(8×16) and 4×(8×8)). It will also return an aggregate cost metric for each of the four partition classes (i.e. 16×16, 16×8, 8×16 and 8×8). In this case the optimum (best-match) location is chosen as that location giving the lowest cost metric comprising the sum of the SAD and a motion-vector costing (see section 4.3.1.1).

4×4 mode—The outcome will be sixteen motion vectors, corresponding to the best match for each of the sixteen 4×4 sub-partitions. It also returns the SAD cost metric for each 4×4 partition. In this case the optimum (best-match) location is chosen as that location giving the lowest cost metric comprising the sum of the SAD and an alternate motion-vector costing (see section 4.3.2.1).

The module expects the user to enqueue the macroblock and seed requests, which will be advanced into the ME engine. Each macroblock will be specified with a macroblock and wavefront identifier, and each seed will be specified with a seed reference picture identifier. The module will conduct the motion search (as illustrated in FIG. 7), accumulating the best metrics over a sequence of seeds (the list) for a macroblock. Upon completion of a seed list (denoted by the final request being enqueued with a last marker) the result will be published to the output queue and the user will be alerted.

The module may optionally be configured to ignore any locations visited during a search where the reference data for that location does not lie wholly within the reference picture.

2. Architecture

Figure 8:
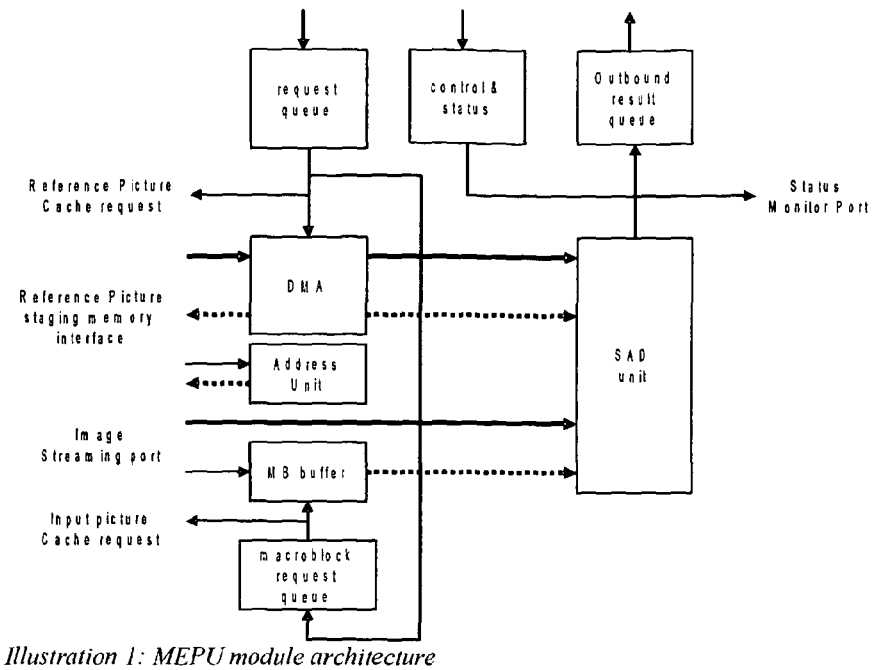
FIG. 8 depicts the architecture of the MEPU core module in accordance with an embodiment of the present invention.
Figure 9:
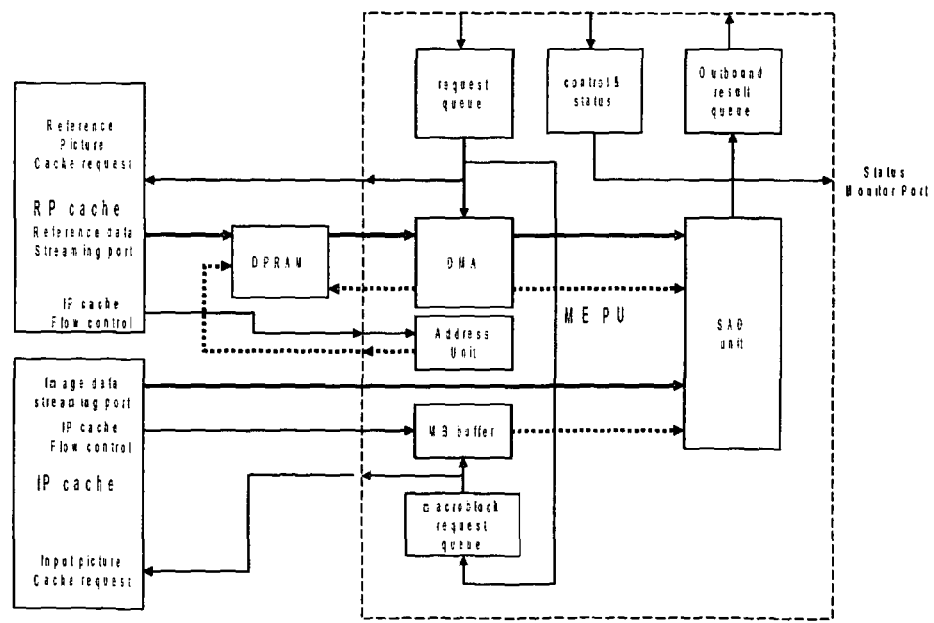
FIG. 9 depicts the integration of the MEPU core into a wider system in accordance with an embodiment of the present invention.

FIG. 8 illustrates the architecture of the MEPU core module. FIG. 9 shows the integration of the MEPU core into the wider system.

3. Interfaces 3.1 Global Signals

| Signal | Direction | Description |
| --- | --- | --- |
| RST | I | Asynchronous reset for all internal modules. |
| CLK | I | Reference clock for all interfaces and internal modules. |

3.2 ME Engine Control Bus

The MEPU control bus conforms to the bus specification described in the ACE Internal Memory/Peripheral Bus Specification. It is comprised of the following signals:

| Signal | Direction | Description |
| --- | --- | --- |
| mepuA [12:2] | I | Word address. |
| mepuBE [3:0] | I | Byte enables (per 8-bit byte). |
| mepuR_W | I | Transfer direction. |
| mepuSEL | I | Target select. |
| mepuRDY [3:0] | O | Target ready. |
| mepuWD [31:0] | I | Write data. |
| mepuRD [31:0] | O | Read data. |
| mepuRDA | O | Read data available. |

The MEPU engine control bus connects to three internal targets.

1. The MEPU engine request queue is mapped to mepuA [9:8]==01 (write only).

2. The MEPU output result queue is mapped to mepuA[9]==0 (read only).

3. The MEPU control & status module is mapped to mepuA[9]==1 (read-write).

3.3 Input Picture Cache Request Bus

The input picture cache request bus comprises a set of signals which pass macroblock requests to the input picture cache sub-system.

| Signal | Direction | Description |
|---|---|---|
| ipCacheSEL | O | Input Picture Cache select. |
| ipCacheRDY | I | Input Picture Cache Ready |
| ipCacheWFI [1:0] | O | Input Picture Cache wavefront specifier |
| ipCacheMBI [2:0] | O | Input Picture Cache macroblock specifier |

The ipCacheRDY signal signals that the cache is ready to accept the request being offered by the SPPA sub-system.

The ipCacheSEL signal signals that the input request queue has a valid seed request pending.

3.4 Reference Picture Cache Request Bus

The reference picture cache request bus comprises a set of signals which pass seed requests to the reference picture cache sub-system.

| Signal | Direction | Description |
|---|---|---|
| impreqSEL | O | Reference Picture Cache select. |
| impreqRDY | I | Reference Picture Cache Ready |
| impreqRID [3:0] | O | Reference Picture Cache reference picture identifier |
| impreqRX [13:0] | O | Reference Picture Cache reference picture seed coordinate |
| impreqRY [13:0] | O | Reference Picture Cache reference picture seed coordinate |

The impreqRDY signal signals that the cache is ready to accept the request being offered by the MPEU sub-system.

The impreqSEL signal signals that the input request queue has a valid macroblock request pending.

3.5 Input Picture Cache Data Bus

The macroblock delivery data interface is comprised of the following signals:

| Signal | Direction | Description |
|---|---|---|
| mbSEL | I | MB staging buffer Target select. |
| mbWD [63:0] | I | Write data. |

3.6 Seed Staging Buffer Bus

The seed staging buffer data interface is comprised of the following signals:

| Signal | Direction | Description |
|---|---|---|
| sbA [7:0] | O | Port 1 (cache-side) D64 address. |
| sbCS [2:0] | O | Port 1 (cache-side) block select |
| sbSEL | O | Port 1 (cache-side) select |
| sbTA [7:0] | O | Port 2 (mepu-side) D384 address. |
| sbTSEL | O | Port 2 (mepu-side) Target select. |
| sbTD [383:0] | I | Port 2 (mepti-side) Read data. |

3.7 Status Port

The status port comprises a single level interrupt output denoting that the motion search result queue is not empty.

| Signal | Direction | Description |
|---|---|---|
| rrIRQ | O | ME result queue not empty interrupt request |

3.8 Status Monitoring Port

The status monitoring port conforms to the specification described in the ACE Status Monitoring Port Specification. It is comprised of the following signals:

| Signal | Direction | Description |
|---|---|---|
| smWA [3:0] | I | Selector write address. |
| smWE | I | Selector write enable. |
| smWD [5:0] | I | Selector write data. |
| smSTATUS [15:0] | O | Selected internal status. |

4. Functional Blocks

4.1 MEPU Control & Status

4.1.1 Functional Description

The MEPU control & status module provides a set of control/status registers that allow an external controller attached to the control bus to perform the following functions:

configure ME engine cost metrics configure ME engine termination thresholds monitor internal status It also provides a status monitoring port that allows a selected subset of the internal status signals to be monitored by hardware outside the ME engine core.

4.1.2 Registers

The MEPU engine control & status module has 6 software-programmable registers. They are mapped into a 24 byte region as follows:

| Offset | Byte 3 | | Byte 2 | | Byte 1 | | Byte 0 |
|---|---|---|---|---|---|---|---|
| $00_{16}$ | ete | ipa il unused | minSearchPoints | | unused | | maxSearchPoints |
| $04_{16}$ | | | unused | | | | 1T |
| $08_{16}$ | | unused | cmvShift | | | cmvLambda | |
| $0C_{16}$ | lce | unused | L1Cap | | unused | | L0Cap |
| $10_{16}$ | cse | unused | ySize | | unused | | xSize |
| $14_{16}$ | | | sadStatus | | | | |

All registers are 32-bit writable only (see section 5.2). Writes to unused bytes are ignored. Reading unused bytes will return the value 0.

4.1.2.1 ete (Early Termination Enable)

Early termination enable. A single bit value, this defaults to TRUE.

4.1.2.2 ipa (Input Picture Analysis Enable)

Input Picture Analysis mode enable. If TRUE selects 4×4 partitions to be searched and costed. If FALSE selects 8×8 partitions to be searched and costed. A single bit value, this defaults to FALSE.

4.1.2.3 il (Interlaced 16×8 Partition Enable)

Interlaced 16×8 partition enable. If TRUE, 16×8 partitions will be derived by splitting the target macroblock into even and odd rows. If FALSE, 16×8 partitions will be derived by splitting the target macroblock into upper and lower halves. A single bit value, this defaults to FALSE.

4.1.2.4 minSearchPoints

The search algorithm performs early termination during the search spiral. This parameter defines the earliest possible threshold at which termination may take place. This 10-bit parameter defaults to 144.

4.1.2.5 maxSearchPoints

The search algorithm is an exhaustive spiral search which spirals out from the nominal (0,0) coordinate—which corresponds to the (23,23) coordinate of the seed buffer, assuming that the (0,0) coordinate is the top left hand corner of the square 48×48 seed buffer.

This 10-bit parameter defaults to 1023 i.e. Maximum physical search capacity of the hardware.

4.1.2.6 rr (Result Ready)

| Bits | Field Name | Access | Reset Value | Notes |
|---|---|---|---|---|
| 1:0 | Result ready | rw | $00_2$ | Control bit pair-see section 5.1. |

The result pair indicates that the set of partition results is ready. The associated control bit may have one of the following values:

0 indicates the result is available
1 indicates the result is not available

A signal indicating that the result is available means that the set of cost metrics and motion vectors have been accumulated over the list and published to the output queue.

4.1.2.7 cmvLambda and cmvShift

Lambda is a fixed point value used to pre-scale the cmv (cost of motion vector) expression. The scaling of the cmv expression will be pre-scaled by cmvLambda (16-bit) and post-scaled by cmvShift (8-bit). See Section 4.3.1 for more details.

4.1.2.8 lce (List Cap Enable)

List cap enable. A single bit value, this defaults to FALSE.

The expected use of the module is to process two seed lists for a given macroblock (i.e. L0 and L1). These L0 and L1 lists generally correspond to forward and backward (in time) search lists, from which seeds are drawn in priority order.

The design is intended to implement a budgeted clock cycle cap on the processing of each list. The algorithm implements a 'fair' allocation of clock cycles to the processing of each seed within a list, according to the following pseudo-code:

```
if (list==0 & seed==0) { L0Residue = L0cap; }
else if(list==0 & seed!=0) { L0Residue = (L0Residue-earlyTerminationUsage); }
L0Allowance = L0Residue>>1;
if (list==1 & seed==0) { L1Residue = L1cap + (L0Residue-PointTerminate); }
else if(list==1 & seed!=0) { L1Residue = (L1Residue-PointTerminate); }
L1Allowance = L1Residue>>1;
if (list==0) {
    MaxSearchPoints < L0Allowance ?       UsableSearchPoints=MaxSearchPoints :
                                          UsableSearchPoints=L0Allowance;
}
if (list==1) {
    MaxSearchPoints < L1Allowance ?       UsableSearchPoints=MaxSearchPoints :
                                          UsableSearchPoints=L1Allowance;
}
```

NOTE:
It is expected that zero or more L1 requests will immediately follow the L0 request list.

4.1.2.9 L0Cap

The search algorithm performs early termination during the search spiral. This parameter defines the maximum clock budget for processing the L0 list. This 12-bit parameter defaults to 1800.

4.1.2.10 L1Cap

The search algorithm performs early termination during the search spiral. This parameter defines the nominal clock budget for processing the L1 list. This 12-bit parameter defaults to 600.

4.1.2.11 cse (Constrained Search Enable)

Constrained search enable. A single bit value, this defaults to FALSE. If FALSE, all locations in a search are considered valid. If TRUE, only locations for which the reference data lies wholely within the reference picture are considered valid.

4.1.2.12 xSize

This 7 bit parameter defines the width of the reference picture (in macroblocks). This value is used in a constrained search to determine whether the current search location is valid.

4.1.2.13 ySize

This 7 bit parameter defines the height of the reference picture (in macroblocks). This value is used in a constrained search to determine whether the current search location is valid.

4.1.2.14 mepuStatus

| Bits | Field Name | Access | Reset Value | Notes |
|---|---|---|---|---|
| 0 | rprqWtStall | r | 0 | |
| 1 | rprqFull | r | 0 | |
| 2 | rprqNotEmpty | r | 0 | |
| 3 | iprqWtStall | r | 0 | |

-continued

| Bits | Field Name | Access | Reset Value | Notes |
|---|---|---|---|---|
| 4 | iprqFull | r | 0 | |
| 5 | iprqNotEmpty | r | 0 | |
| 6 | mepuResultQueueFull | r | 0 | |
| 7 | mepuBusy | r | 0 | |
| 8 | dmaBusy | r | 0 | |
| 31:9 | — | r | 0 | Hardwired. |

The dmaBusy field indicates that the unit dma is currently active fetching the next queued request item (e.g. Macroblock or seed buffer). The following values may be returned when this field is read:
 0 passive
 1 active The mepuBusy field indicates whether the ME engine PU is active. The following values may be returned when this field is read:
 0 passive
 1 active The rprqWtStall field indicates whether a write transaction to the reference picture seed request queue is stalled because the queue is full. The following values may be returned when this field is read:
 0 indicates an inbound queue write transaction is not currently stalled.
 1 indicates an inbound queue write transaction is currently stalled.

The rprqNotEmpty field indicates whether the input reference picture seed request queue is empty. The following values may be returned when this field is read:
 0 indicates an inbound request queue is empty.
 1 indicates an inbound request queue is not empty.

The rprqFull field indicates whether a reference picture seed request may be enqueued. The following values may be returned when this field is read:
 0 indicates an inbound request queue is not full.
 1 indicates an inbound request queue is full.

The iprqWtStall field indicates whether a write transaction to the input picture macroblock request queue is stalled because the queue is full. The following values may be returned when this field is read:
 0 indicates an inbound queue write transaction is not currently stalled.
 1 indicates an inbound queue write transaction is currently stalled.

The iprqNotEmpty field indicates whether the input picture macroblock request queue is empty. The following values may be returned when this field is read:
 0 indicates an inbound request queue is empty.
 1 indicates an inbound request queue is not empty.

The iprqFull field indicates whether an input picture macroblock request may be enqueued. The following values may be returned when this field is read:
 0 indicates an inbound request queue is not full.
 1 indicates an inbound request queue is full.

4.1.3 Status Monitoring

The MEPU control & status module has 16 hardware-programmable status select registers. They are located in the status select port register space as follows:

| Address | Register Name |
|---|---|
| 0 | StatusSelect00 |
| 1 | StatusSelect01 |
| 2 | StatusSelect02 |
| 3 | StatusSelect03 |
| 4 | StatusSelect04 |
| 5 | StatusSelect05 |
| 6 | StatusSelect06 |
| 7 | StatusSelect07 |
| 8 | StatusSelect08 |
| 9 | StatusSelect09 |
| 10 | StatusSelect10 |
| 11 | StatusSelect11 |
| 12 | StatusSelect12 |
| 13 | StatusSelect13 |
| 14 | StatusSelect14 |
| 15 | StatusSelect15 |

Each of the StatusSelect00 . . . StatusSelect15 registers controls which internal status signal is output on the correspondingly numbered bit of the smSTATUS signal. Each register has the same layout, as follows:

| Bits | Field Name | Access | Reset Value | Notes |
|---|---|---|---|---|
| 5:0 | StatusSelect | w | 0 | |

The StatusSelect field determines which internal status bit drives the associated bit of the smSTATUS signal. If set to a value less than 32, the bit indexed by that value in the mepuStatus register is selected. If set to any other value, the selection is undefined.

4.2 Request Queue

Macroblock partition specifications for 8×8 partitions are:

| Drawing 1: macroblock partitions | | | | | |
|---|---|---|---|---|---|
| 8×8_a | 8×8_b | 8×16_a | 8×16_b | 16×8_a | 16×16 |
| 8×8_c | 8×8_d | | | 16×8_b | |

Macroblock partition specifications for 4×4 partitions are:

| Drawing 2: macroblock partitions | | | |
|---|---|---|---|
| 0 | 1 | 2 | 3 |
| 4 | 5 | 6 | 7 |
| 8 | 9 | 10 | 11 |
| 12 | 13 | 14 | 15 |

4.2.1 Registers

The MEPU inbound request queue comprises 4 software-programmable registers. They are mapped into a 16 byte region as follows:

| Offset | Byte 3 | | Byte 2 | | Byte 1 | | Byte 0 |
|---|---|---|---|---|---|---|---|
| $00_{16}$ | | | imv | | | | |
| $04_{16}$ | unused | WF | unused | MBI | unused | list | unused last |
| $08_{16}$ | | | pmv | | | | |
| $0C_{16}$ | unused | | MBY | | unused | | MBX |

The registers are 32-bit writable only (see section 5.2). Any write to offset $00_{16}$ will cause the entire entry to be advanced into the request queue.

The imv (initial motion vector) is a 32-bit field packed according to the standard definition i.e.
 31:28 Reference picture identifier
 27:14 Motion vector x
 13:00 Motion vector y The last field is a single bit marker which identifies the request to be the last request for a given search list. When this information advances to the MEPU it will cause the aggregate cost and motion vector metrics to be published to the output queue.

The list field is a single bit marker which indicates if the request belongs to list 0 (0) or list 1 (1).

The WF (2-bits) and MBI (3-bits) are parameters which define the macroblock address in the input picture cache. This information will be passed directly to the input picture cache.

The pmv is a 32-bit field packed according to the standard definition i.e.
 27:14 Predicted motion vector x
 13:00 Predicted motion vector y See section 4.5.1 for more detail on how the actual and predicted motion vectors are used in the calculation of the best-match cost metrics.

The MBX and MBY are 6-bit parameters which define the macroblock address (in units of macroblocks).

This is used in conjunction with the initial motion vector to define the address of the macroblock in a given reference picture.

4.2.1.1 Calculation of Reference Picture Cache Address

Figure 10:
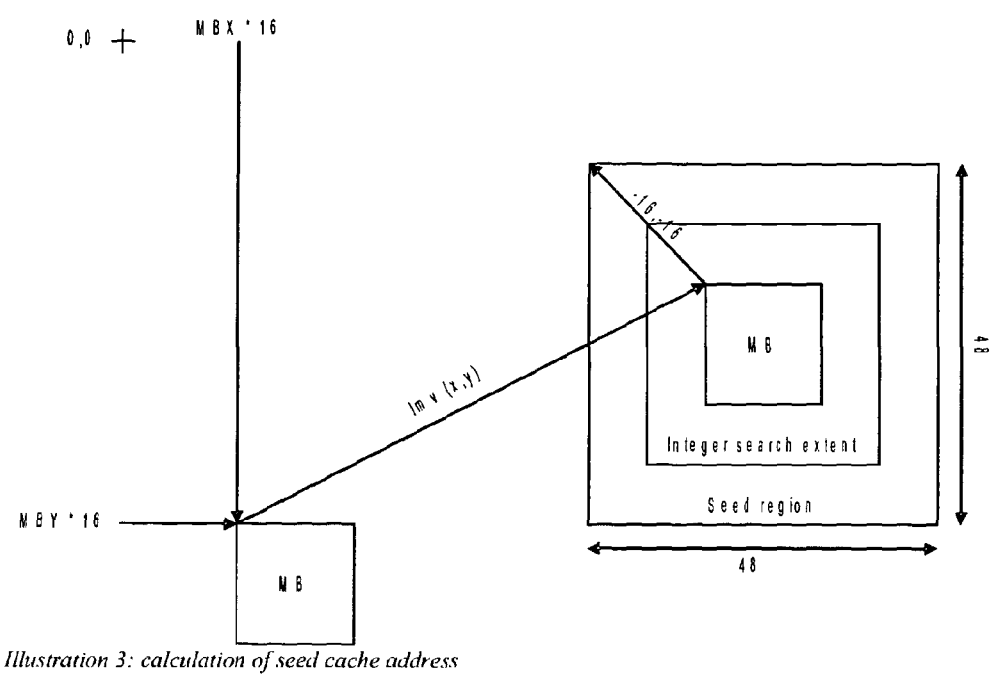
FIG. 10 depicts a calculation of a reference picture cache address in accordance with an embodiment of the present invention.

The reference picture cache address is calculated with respect to FIG. 10.

4.3 Outbound Result Buffer

The output (result) is 32-bit accessible register file that accesses the head of the result queue, which can be accessed as internal target 2 on the MEPU control bus interface. Reading the entry at address $2C_{16}$ causes the entire entry to be removed from the queue.

The queue entries have two formats, depending upon the operating mode.
 1. The engine is operating upon 8×8 partitions (ipa=FALSE—see section 4.1.2.2)
 2. The engine is operating upon 4×4 partitions (ipa=TRUE—see section 4.1.2.2)

4.3.1 8×8 Mode Results

| Address [6:2] | byte3 | byte2 | byte1 | byte0 |
|---|---|---|---|---|
| | | Name | | |
| $00_{16}$ | cost16×8 | | cost16×16 | |
| $04_{16}$ | cost8×8 | | cost8×16 | |
| $08_{16}$ | Zero fill | | | |
| $0C_{16}$ | mv16×16 | | | |
| $10_{16}$ | mv16×S_a | | | |
| $14_{16}$ | mv16×S_b | | | |
| $18_{16}$ | mv8×16_a | | | |
| $1C_{16}$ | mv8×16_b | | | |
| $20_{16}$ | mv8×8_a | | | |
| $24_{16}$ | mv8×8_b | | | |
| $28_{16}$ | mv8×8_c | | | |
| $2C_{16}$ | mv8×8_d | | | |

The mv (motion vector) is a 32-bit field packed according to the standard definition i.e.
 31:28 Reference picture identifier
 27:14 Motion vector x
 13:00 Motion vector y The reference picture identifier is carried forward from the input request, and comprises the reference picture identifier associated with the best-match motion vector. There is one resolved motion vector for each best-match per partition.

The cost metrics are the aggregate costs for each partition class i.e.

$$\text{cost}16 \times 16 = Csad_{16 \times 16} + Cmv_{16 \times 16}$$

$$\text{cost}16 \times 8 = Csad_{16 \times 8A} + Cmv_{16 \times 8A} -$$
$$Csad_{16 \times 1b} + Cmv_{16 \times 1b}$$

$$\text{cost}16 \times 8 = Csad_{3 \times 16A} + Cmv_{8 \times 16a} -$$
$$Csad_{8 \times 18b} + Cmv_{3 \times 16b}$$

$$\text{cost}8 \times 8 = Csad_{8 \times 8a} + Cmv_{8 \times 8a} +$$
$$Csad_{8 \times 8b} + Cmv_{8 \times 8b} +$$
$$Csad_{8 \times 8c} - Cmv_{8 \times 8c} +$$
$$Csad_{8 \times 8d} + Cmv_{8 \times 8d}$$

4.3.1.1 8×8 Cost Metric: Informative

The cost of motion vector metric (Cmv) for a given actual motion vector (amvy, amvx) is defined as:

$$cmv=\lambda*(mv\text{BitCost}((amvy+\text{delta}mvy)-pmvy)+mv\text{Bit-Cost}((amvx+\text{delta}mvx)-pmvx))$$

where
 (pmvy, pmvx) is the predicted motion vector for the macroblock
 λ is a user defined encoding parameter.
 (deltamvy, deltamvx) is the motion offset for the current search location (i.e. the offset within the spiral search region).

Note: The predicted motion vector and the actual motion vector are enqueued with the request and the lambda parameter is a CSR block setting.

The function mvBitCost( ) in the above equation is defined as:

$$mv\text{BitCost}(d)=1+2*(\text{Count}LZ(0)-\text{Count}LZ(|d|))$$

and hence $$cmv=2\lambda*(1+2*\text{Count}LZ(0)-\text{Count}LZ(|mvy-pmvy|)-\text{Count}LZ(|mvx-pmvx|))$$

Note that CountLZ(0) is an implementation defined constant value.

In each case the best metric is recorded at the current search position if (and only if) the current (Csad+Cmv) is less than the stored (Csad+Cmv).

The final implementation comprises a post-scaling step defined as:

$$cmv=(2\lambda*(1+2*\text{Count}LZ(0)-\text{Count}LZ(|mvy-pmvy|)-\text{Count}LZ(|mvx-pmvx|))+\text{LAMBDA\_ROUND})>>\text{LAMBDA\_SHIFT}$$

$$\text{LAMBDA\_SHIFT}=cmv\text{shift}$$

$$\text{LAMBDA\_ROUND}=cmv\text{shift}>0?1<<(cmv\text{shift}-1):0$$

The variable cmvShift is defined in Section 4.1.2.6.

4.3.2 4×4 Mode Results

In order to optimise the re-use of the hardware resources, the 4×4 mode results are split across two queue entries. The results for partitions 0-7 are contained in the first queue entry, whilst the results for partitions 8-15 are contained in the second queue entry. As before, an entire queue entry is removed when the field at address 2C16 is read.

| Address [6:2] | Name | | | |
|---|---|---|---|---|
| | byte3 | byte2 | byte1 | byte0 |
| $00_{16}$ | | sad1/9 | | sad0/8 |
| $04_{16}$ | | sad3/11 | | sad2/10 |
| $08_{16}$ | | sad5/13 | | sad4/12 |
| $0C_{16}$ | | sad7/15 | | sad6/14 |
| $10_{16}$ | | | mv0/8 | |
| $14_{16}$ | | | mv1/9 | |
| $18_{16}$ | | | mv2/10 | |
| $1C_{16}$ | | | mv3/11 | |
| $20_{16}$ | | | mv4/12 | |
| $24_{16}$ | | | mv5/13 | |
| $28_{16}$ | | | mv6/14 | |
| $2C_{16}$ | | | mv7/15 | |

The mv (motion vector) is a 32-bit field packed according to the standard definition i.e.

31:28 Reference picture identifier
27:14 Motion vector x
13:00 Motion vector y

The reference picture identifier is carried forward from the input request, and comprises the reference picture identifier associated with the best-match motion vector. There is one resolved motion vector for each best-match per partition.

The sad metrics are the outcome of a simple sum-of-absolute differences for the partition.

The decision for the best match for the nth 4×4 partition is made on the basis of the lowest cost4×4_n metric, defined as:

$$\text{cost4}\times 4\_n = Csad_{4\times 4\_n} + Cmv_{4\times 4}$$

4.3.2.1 4×4 Cost Metric: Informative

The motion vector cost metric (Cmv4×4) used in the expression above is defined as:

$$Cmv_{4\times 4} = (12*(\text{abs}(\text{delta}mvx) - \text{abs}(\text{delta}mvy)) - 5*\text{abs}(\text{abs}(\text{delta}mvx) - \text{abs}(\text{delta}mvy)) + 1) >> 1$$

where (deltamvy,deltamvx) is the motion offset for the current search location (i.e. the offset within the spiral search region).

Note that this cost expression is the same for each 4×4 partition.

5. General Notes
5.1 Control Bit Pairs

In a number of the control registers, single bit control values are presented as bit pairs in the register. The results of writing to a bit pair are as follows:

$00_2$ has no effect.
$01_2$ sets the associated control bit to 1.
$10_2$ sets the associated control bit to 0.
$11_2$ has no effect.

When a bit pair is read, the returned value is $01_2$ if the associated control bit is set to 1 and $00_2$ if the associated control bit is set to 0.

The reason for implementing control bits as bit pairs is that it allows a subset of the control bits in a given register to be modified using a single write operation, rather than using a read-modify-write operation.

5.2 32-bit Writable Registers

Certain registers are described as being 32-bit writable. A 32-bit writable register can only be written by simultaneously writing to all bytes of the 32-bit word in which the register is located. If the register occupies all bytes of the 32-bit word (i.e. is 32 bits in size), this means the register can only be written as a whole. If the register only occupies some bytes of the 32-bit word (i.e. is less than 32 bits in size), this means that any other registers located in the same 32-bit word must also be written when the register is written.

Writes to a 32-bit word containing a 32-bit writable register are ignored if not all bytes are enabled to be written.

The invention claimed is:

1. A digital processing apparatus suitable for use in video encoding, the apparatus being arranged to conduct motion searching by comparing an image macroblock against a plurality of positions within an image search region, the apparatus comprising:
   a first 2D array comprising interconnected multi-directional shift registers for storing and shifting image values corresponding to a search window within the search region;
   a second 2D array comprising registers for storing image values corresponding to a macroblock;
   a distortion calculation module operatively connected to the first and second 2D arrays, the distortion calculation module being arranged to calculate and output a distortion value corresponding to the difference between image values stored in associated registers of the first and second arrays, the distortion value thereby quantifying the correlation between the search window and the macroblock;
   wherein the apparatus is arranged, in use:
      to control the shift registers of the first 2D array to pass image values between adjacent shift registers to translate the position of the search window within the search region; and
      to track distortion values outputted after progressive shifts of the first 2D array thereby determining an optimal registration position of the macroblock relative to the search region;
   a time budget management module for controlling at least the number of shifts carried out by the first 2D array so as to manage the time spent performing each motion search operation; and
   a seed list generator for generating a prioritized list of seed search regions against which a macroblock is to be searched, the seed list generator being arranged to down-sample a video image frame and a macroblock, feed the down-sampled video image frame and macroblock into the first and second 2D arrays to conduct a motion search operation and thereby determine a prioritized list of seed search regions within the original image frame against which the original macroblock may be searched, wherein the time budget management module is operatively connected to the seed list generator to receive a prioritized list of candidate search regions from the seed list generator.

2. The apparatus of claim 1, wherein the interconnections between the multi-directional shift registers are bi-directional and cross-link the shift registers to one another so as to enable image values to be passed in either direction between adjacent shift registers both horizontally and vertically.

3. The apparatus of claim 1, wherein the shift registers are arranged to pass values in a common direction per shift.

4. The apparatus of claim 1, further comprising a cache for storing image values corresponding to the search region, the apparatus being arranged, in use, to transfer appropriate image values from the cache to shift registers disposed along the periphery of the first 2D array so as to reconstruct the search window following a shift operation.

5. The apparatus of claim 1, further arranged, in use, to initially load image values into the first 2D array corresponding to a search window centrally located within the search region and then control the shift registers of the first 2D array to progressively translate the position of the search window within the search region in a spiral search pattern.

6. The apparatus of claim 1, further comprising:
a motion vector generator for generating a motion vector corresponding to the relative positional difference between the macroblock and the search window; and
a bandwidth cost estimation module for estimating a bandwidth cost associated with a distortion value and a corresponding motion vector, said bandwidth cost estimation module being arranged to track an optimal bandwidth cost associated with encoding a macroblock.

7. The apparatus of claim 1, wherein the time budget management module is operatively connected to the distortion calculation module for monitoring the distortion value associated with each shift, said time budget management module being arranged to early terminate a shift operation if the distortion value is below a threshold value.

8. The apparatus of claim 7, wherein the time budget management module is arranged to dynamically control the threshold value.

9. The apparatus of claim 1, wherein the time budget management module is arranged to receive a time budget within which to perform a plurality of motion search operations and dynamically apportion the time spent on each motion search operation in dependence on the progress of each motion search and/or the priority assigned to each motion search operation.

10. The apparatus of claim 1, further arranged to compare an image macroblock as well as its sub-partitions against a position within the image search region as part of a common comparison operation, wherein the distortion calculation module is arranged to calculate and output, as part of a common operation, a plurality of distortion values, each distortion value corresponding to either a macroblock or one of the sub-partitions of the macroblock.

11. The apparatus of claim 10, wherein the distortion calculation module comprises a distortion value summing tree for progressively summing the differences between image values in the first and second 2D arrays, the root of the summing tree being arranged to output the total sum of the differences between the first and second 2D arrays and intermediate sampling points within the tree being arranged to output the correlation between macroblock sub-partitions and their associated positions within the search region.

12. The apparatus of claim 10, further comprising a cost-tracking table arranged to track optimal distortion values associated with the macroblock and each sub-partition and also track the motion vectors associated with the optimal distortion values to thereby concurrently generate a set of bandwidth costs, and wherein the apparatus is further arranged, in use, to select the most appropriate encoding solution in response to the set of bandwidth costs within the cost-tracking table.

13. A method of conducting motion searching for use in video encoding in which an image macroblock is compared against a plurality of positions within an image search region, the method comprising the steps of:
loading image values corresponding to a search window within the search region into interconnected multi-directional shift registers of a first 2D array;
loading image values corresponding to a macroblock into the registers of a second 2D array;
calculating and outputting a distortion value corresponding to the difference between image values stored in associated registers of the first and second arrays, the distortion value thereby quantifying the correlation between the search window and the macroblock;
controlling the shift registers of the first 2D array to pass image values between adjacent shift registers to translate the position of the search window within the search region;
tracking distortion values outputted after progressive shifts of the first 2D array to determine an optimal registration position of the macroblock relative to the search region;
controlling at least the number of shifts carried out by the first 2D array so as to manage the time spent performing each motion search operation; and
generating a prioritized list of seed search regions against which a macroblock is to be searched, wherein the generating comprises
down-sampling a video image frame and a macroblock, and
feeding the down-sampled video image frame and macroblock into the first and second 2D arrays to conduct a motion search operating, thereby determining a prioritized list of seed search regions within the original image frame against which the original macroblock may be searches; and
receiving a prioritized list of candidate search regions, responsive to the generating.

\* \* \* \* \*